Figure 1:
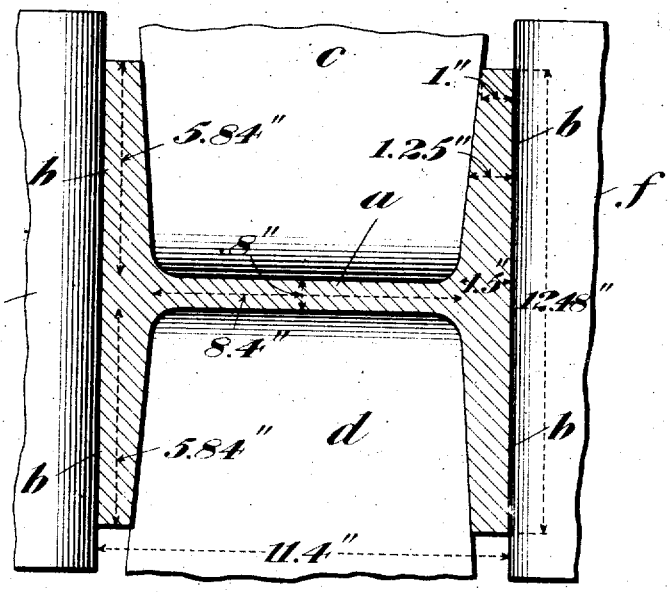
Figure 2:
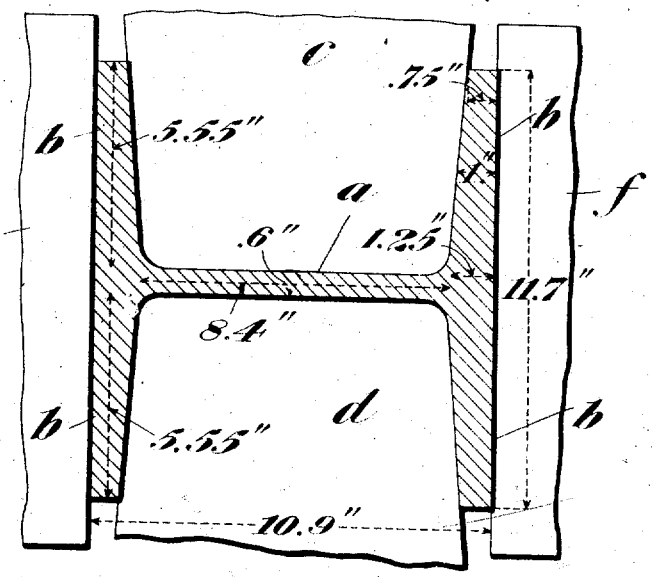
Figure 3:
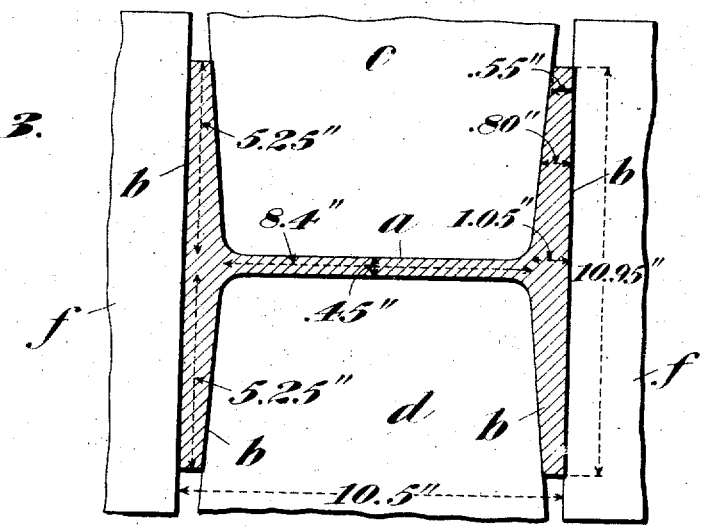
Figure 4:
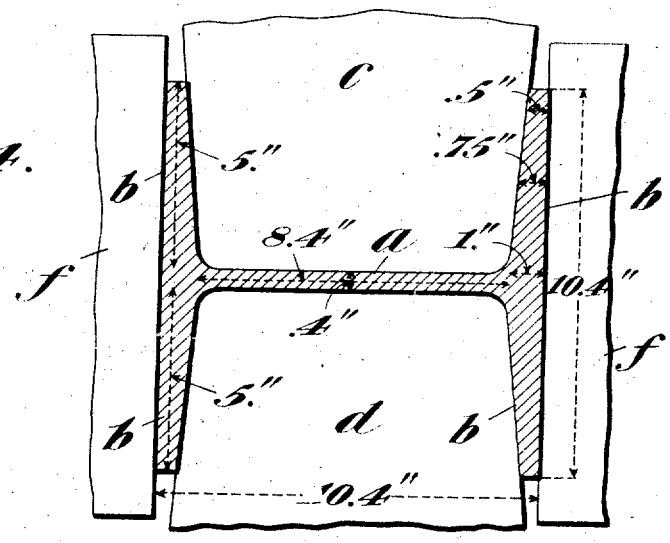

June 16, 1925.

Re. 16,097

H. GREY

ROLLING FLANGED METAL BEAM OR BAR

Original Filed March 23, 1904 3 Sheets-Sheet 1

INVENTOR
Henry Grey, deceased
American Universal Mill Company
Assignee.

BY Dodge and Sons, ATTORNEYS.

June 16, 1925.

Re. 16,097

H. GREY

ROLLING FLANGED METAL BEAM OR BAR

Original Filed March 23, 1904 3 Sheets-Sheet 3

INVENTOR
Henry Grey, deceased
American Universal Mill Company
Assignee

BY
Dodge and Sons
ATTORNEYS

June 16, 1925.

Re. 16,097

H. GREY

ROLLING FLANGED METAL BEAM OR BAR

Original Filed March 23, 1904 3 Sheets-Sheet 3

INVENTOR
Henry Grey deceased
BY American Universal Mill Company
Assignee
Dodge and Sons,
ATTORNEYS Reissued June 16, 1925.

Re. 16,097

UNITED STATES PATENT OFFICE.

HENRY GREY, DECEASED, LATE OF NEW YORK, N. Y., BY AMERICAN UNIVERSAL MILL COMPANY, OF SCRANTON, PENNSYLVANIA, ASSIGNEE.

ROLLING FLANGED METAL BEAM OR BAR.

Original No. 1,034,361, dated July 30, 1912, Serial No. 199,630, filed March 23, 1904. Application for reissue filed April 18, 1925. Serial No. 24,286.

*To all whom it may concern:*

Be it known that HENRY GREY, deceased, late a resident of New York city, in the county of New York and State of New York, did invent certain new and useful Improvements in Rolling Flanged Metal Beams or Bars, for which Letters Patent No. 1,034,361 were granted to him under date of July 30, 1912, which said Letters Patent were duly assigned to the American Universal Mill Company, a corporation of the State of South Dakota, and having its principal place of business at Scranton, in the county of Lackawanna and State of Pennsylvania, and that said corporation now makes application for reissue of said Letters Patent, of which the following is a specification.

This invention relates to a process of rolling flanged shapes or sections, such, for instance, as metal I-beams and bars having a web between flanges.

In another application filed in the United States Patent Office September 29th, 1902, and bearing Serial Number 125,316, there is claimed the process of rolling flanged shapes or sections comprising the provision of a special blank in which the mean thickness of each flange-portion and the thickness of the web-portion are in the proportion in which the said thicknesses exist in the finished product to which the blank is to be reduced, and during the reduction of the blank reducing the said thicknesses in the said proportion.

In the present application there is disclosed and claimed a process of rolling flanged shapes or sections consisting in a proportionate reduction of the web-portion and flange-portions of the blank in area of cross-section by rolling pressures on the sides of the said blank-portions and on the edges of the flange-portions, and in providing a special blank in which the area of cross-section of the web-portion and the area of cross-section of each flange-portion are in the proportion in which the cross-sectional areas of the said portions are to exist in the finished product to which the said blank is to be reduced, and substantially maintaining the said proportion in the cross-sectional areas of the said portions of the blank during the reduction of the blank.

Figure 5:
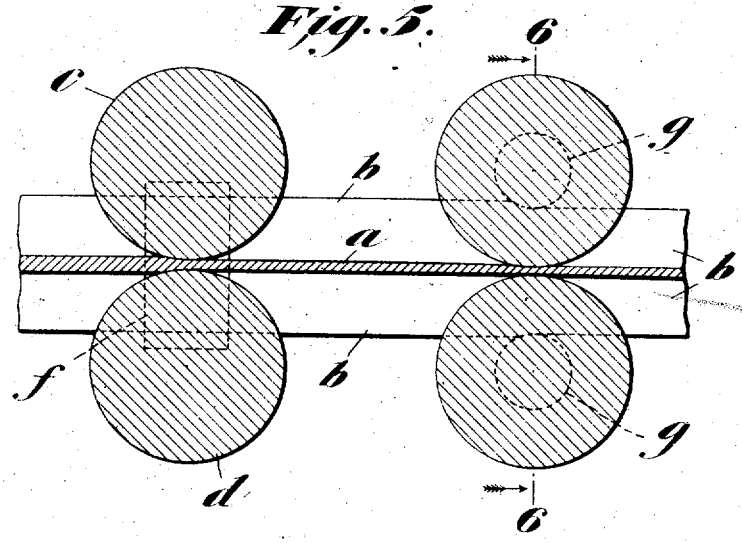
Figure 6:
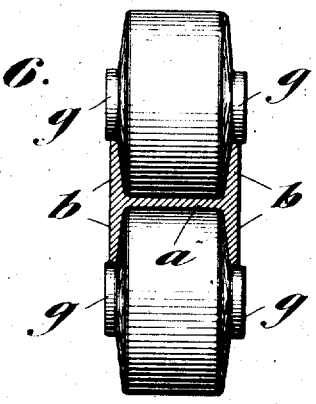

In the accompanying drawings, Figures 1, 2, 3 and 4 are cross-sectional views of a blank, shape or section illustrating the reduction of the blank by rolling pressures on the web-portion and flanged portions of the blank during succesive blank-reducing passes of the blank. Fig. 5 is an elevation diagrammatically and in central section, illustrating a universal mill employed in applying rolling pressures to the sides of the web-portion and flange-portions of the blank, and also showing supplemental rolls arranged a suitable distance from the universal mill and employed in applying rolling pressures on the edges of the flanged-portions. Fig. 6 is a vertical section on line 6—6, Fig. 5, looking in the direction indicated by the arrow.

The drawings also diagrammatically illustrate the two horizontal rolls *c* and *d* and the two vertical rolls *f* and *f* of a universal mill. The vertical rolls *f* have their axes in a vertical plane passing through the axes of horizontal rolls *c* and *d*. The horizontal rolls *c* and *d* are arranged to operate upon opposite sides respectively of the web-portion *a* and upon the inner sides of the flange-portions *b* and are relatively readjusted between successive passes of the blank through the mill. The vertical rolls are arranged to operate upon the outer sides of the flanges and are relatively readjusted between succesive passes of the blank through the mill.

The manner of supporting the rolls of a universal mill, means for adjusting the horizontal rolls of the said mill toward and from each other, and means for adjusting the vertical rolls of the mill from and toward each other are too well known in the art to require illustration and description in this application.

A pair of horizontal rolls *g*, arranged to apply rolling pressures upon the edges of the flanges, are illustrated in Figs. 5 and 6, and, as shown in Fig. 5, are located at one side of and a suitable distance from and parallelly with the horizontal rolls of the universal mill. In Fig. 5 a blank is shown in position not only being reduced by a universal mill but being also operated upon by rolling pressures upon the edges of the flanges by the rolls *g* which are relatively adjusted as required preparatory to their operation.

The means of supporting the rolls *g* and means for adjusting the said rolls to increase or decrease the space between them, are too well known in the art to require illustration and description in this application.

The dimensions of the different portions of the blank are indicated in the first four figures of the drawings, and upon reference to these dimensions it will be observed that the web-portion and each flange-portion of the blank are proportionately reduced in area of cross-section. That is, during each of successive passages of the blank a proportionate or substantially proportionate reduction in cross-sectional area is given to both the web-portion and the flange-portions, and in the case illustrated an I-beam is shown being made. By proportionate reduction of the web-portion and flange-portions in area of cross-section is meant the same percentage of reduction in area of cross-section; that is, if the web is reduced a given per cent in area in one pass, the flanges are reduced the same or substantially the same per cent of their area in this same pass.

There is employed, preferably, a special blank having the cross-sectional area of its web-portion and the cross-sectional area of each flange-portion in the proportion which the cross-sectional area of the said flange-portion and the cross-sectional area of the web-portion bear to each other in the finished product to which the blank is to be reduced and rolling the said flange-portion and web-portion and thereby reducing the said portions in area of cross-section in the proportion in which the cross-sectional area of the said portions bear to each other in the blank and in the finished product. In other words, there is employed a blank having an area of cross-section in its web-portion and an area of cross-section in each flange-portion in the proportion which the cross-sectional areas of the said portions exist in the finished product, and the said portions of the blank are proportionately reduced in area of cross-section during each and every passage of the blank. The successive passes are formed by suitably adjusting the horizontal rolls *c* and *d* toward each other, and by suitably adjusting the vertical rolls *f* inwardly toward each other and also adjusting the rolls *g g* toward each other all in such degree to insure the requisite proportional cross-sectional reduction.

To carry out the hereinbefore mentioned process take an ingot and reduce it upon a cogging mill to suitable dimensions so as to form the hereinbefore described special blank. The blank, which, of course, is in suitably heated condition, is reduced, as hereinbefore stated, by the horizontal rolls *c* and *d* and the vertical rolls *f* of the universal mill and by the supplemental flange-edge-rolling rolls *g*. Any suitable number of passages are given to the blank. Several illustrative passes are shown in the drawings.

Having thus described the invention what is claimed as new and desired to secure by Letters Patent is:

1. The process of rolling flanged shapes which consists in subjecting a blank having web and flange portions, and the web portion of which is substantially of the same width as that of the finished bar, to successive rolling operations on the sides of said web portion and on the outer faces of the flange portions simultaneously, each of which operations successively reduces the cross sectional area of the shape in its web and flanges in substantially the same proportion from the blank to the finished product and rolling the flange edges between said rolling operations.

2. The process of rolling flanged shapes which consists in subjecting a blank having a web and flanges, the web of which is substantially of the same width as that of the finished bar, to successive rolling operations, each of which consists in rolling the faces of the web and of the flanges simultaneously and in thereafter rolling the edges of the flanges, each of said rolling operations simultaneously reducing the thickness of the web and the mean thickness and width of each flange and at the same time reducing the cross sectional area to the same proportionate extent.

3. The process of rolling flanged shapes which consists in subjecting a blank having a web and flanges, the areas of the web and areas of the flanges having approximately the same relative proportions as they have in the finished product, to successive rolling operations on the sides of the web and of the flanges, and simultaneously therewith subjecting each of the flanges to rolling pressures applied to the edges thereof by separate rolls, each of said rolling operations reducing the thickness of the web and also reducing the mean thickness and width of each flange while simultaneously reducing the cross sectional area of the web and of the flanges to the same proportionate extent.

4. The process of rolling flanged shapes which consists in taking a blank, the thickness of the web of which and the mean thickness of each flange of which substantially have the same relative proportions as they are to have in the finished product, and the areas of the web and the areas of the flanges having approximately the same relative proportions as they have in the finished product, and subjecting the blank to a series of rolling operations on the sides of the web and of the flanges simultaneously and then on the edges of the flanges, each of said operations successively reducing the cross sectional areas of the flanges and of the web of the shape to the same predetermined extent.

5. The process of rolling H-beams and I-beams which consists in taking a blank having a web and two flanges, and the cross sectional area of the flanges and web of which, respectively, bear substantially the same proportional area to each other as they are to have in the finished beam, and subjecting said blank to a series of rolling operations until the finished beam is produced, the specified proportional area between the flanges and the web being preserved during each of said rolling operations, the flange edges also being rolled between said rolling operations.

In testimony whereof, I, a duly authorized officer of and on behalf of the American Universal Mill Company, have hereunto attached my signature.

AMERICAN UNIVERSAL MILL COMPANY,
*Assignee of Henry Grey, deceased.*
By HENRY H. BRADY,
*President.*